Patented June 30, 1936

2,045,639

UNITED STATES PATENT OFFICE 2,045,639

PROCESS FOR THE PRODUCTION OF MOLTEN IRON OR STEEL BY THE DIRECT METHOD

Fritz Eulenstein, Cologne-on-the-Rhine, and Adolf Krus, Sturzelberg uber Neuss, Germany, assignors to "Sachtleben" Aktiengesellschaft für Bergbau und Chemische Industrie, Cologne-on-the-Rhine, Germany Application October 28, 1933, Serial No. 695,704
In Germany October 6, 1932

11 Claims. (Cl. 75—38)

This invention relates to a process for the production of molten iron or steel by the direct method.

Iron has already been produced by the direct method with the aid of gaseous reducing agents. For this process rotary tube furnaces were preferably employed through which the charge was passed in counter-current to the reducing gases. The heat required for the process was either supplied to the rotary tube by the gas or said drum was heated externally. When carrying out this process, usually only spongy iron was obtained because it was difficult and moreover costly to heat the material under treatment in a reducing atmosphere up to the casting temperature of iron. For these reasons the material under treatment was usually melted down in a special furnace when it was desired to produce molten iron or steel.

Iron has also been produced directly with the aid of solid reducing agents. Thus for example, briquettes of ore and reducing agent were coated with a layer of carbon and heated in a rotary tube furnace, which they traversed in counter-current to the heating gases. During this process the core portion of the briquettes was reduced to metal whilst the layer of carbon prevented oxidizing constituents of the heating gases from penetrating into the core. When it was desired to produce iron alloys, such as ferro-silicon, the raw materials necessary for this purpose, such as silica or elementary silicon were mixed with the ore during the preparation of the briquettes.

Attempts have also been made to protect the reduced iron from re-oxidation by the production of a slag thereon. To this end, the mixture of substances which interact during the reaction was treated with additions, such as common salt or ammonium chloride, silica in conjunction with sawdust, molten pitch, tar, molasses, marl, carbonates, clay and the like, prior to being formed into lumps. A vitreous slag was formed from these additional substances which was apparently intended to prevent gases having an oxidizing action from coming into contact with the iron. The formation of slags would obviously not need to take place prior to the period at which the effect of the reducing agent was no longer sufficient to prevent the reoxidation of the already reduced iron. The known processes in which the reduction of the iron is carried out by directly heating the charge consisting of iron ore, carbon and flux in batches in a rotary tube furnace naturally also made use of this effect of the slags which were formed on heating the reduced charge to fusion temperature. From the point of view of heat economy, these processes are considerably more advantages than those in which the reduction is carried out with the aid of gases. In the latter, as also in the case of processes where iron silicates fused from ores by special methods, are reduced by means of solid carbon which is immersed in the molten bath, great difficulties arose due to the fact that the furnace lining could not withstand this treatment.

The present invention aims at obviating these drawbacks.

To this end, according to the invention, molten iron or steel is produced direct by the reduction of iron ores or the like in directly heated moving furnaces—more particularly rotary furnaces—using carbon as the reducing agent. The carbon and silica contents of the charge are so adjusted that, whilst the temperature continually increases, spongy iron and ferrous silicate slags are first formed simultaneously and that the ferrous oxide derived from the ferrous silicate slag with lime, is reduced during the subsequent fusion. The furnace is preferably operated intermittently in such a manner that a preferably preheated charge is introduced into said furnace then reduced and molten and after tapping off the iron and the slag, the furnace is then ready for a further charge. If the furnace be of suitable length, it is possible to convert the intermittent operation into a continuous operation.

The use of the moving furnace—preferably a rotary furnace—ensures that the silica, iron oxides and reducing carbon are brought into intimate contact which very greatly facilitates the formation of slag and obviously also greatly assists the reduction.

The quantity of silica present in the charge should be so chosen that the slag is formed simultaneously with the spongy iron which is produced at a temperature of about 900° to 1000° C. The slag is consequently already viscous or pasty during the formation of the spongy iron so that the individual particles of spongy iron become so to speak already enveloped with slag as they are produced, due to the movement of the furnace. This prevents, at least to a great extent, the re-oxidation of the spongy iron, in any case re-oxidation does not occur to any detrimental degree and accordingly any attack of the furnace lining by ferrous oxide which on the contrary combines with the silica content of the charge. Moreover the carbon content of the charge which is so adjusted in accordance with the invention, as to be adequate for reduction until the charge is completely molten, prevents any extensive reoxidation.

During the further course of the reduction the reduced spongy iron comes into intimate contact with the excess of the incandescent reducing carbon, due to the movement of the furnace, and said spongy iron accordingly absorbs carbon and commences to melt. With rising temperature the ferrous silicate slag is decomposed more and more by the added lime. The lime replaces the ferrous oxide in the silicate and calcium silicate is formed with the result that the ferrous oxide is liberated and rendered available for reduction. The reduction of the ferrous oxide is also partially brought about by the carbon in the already molten iron, thereby leading to a reduction in the carbon content of the bath. An unexpected effect of this process is that the addition of lime does not disturb the formation of ferrous silicate slag which is produced at the outset of the reduction. Only a small quantity of lime is necessary for the decomposition of the ferrous silicate slag, even 5% being sufficient in some cases, but the lime does not have a detrimental effect even when for example in order more effectively to protect the furnace lining or for other reasons, four or five times the quantity required for the decomposition of the ferrous silicate slag or even more, is used.

The silica required for the hereindescribed process can be added to the originating material, for example in the form of siliceous material or alternatively ores can be employed which contain just the requisite quantity of silica. Such ores are usually not particularly suitable for blast furnaces. The possibility of using such materials thus constitutes a further advantage of the hereindescribed process. By mixing ferrous ores or the like rich in silica with such ores poor in silica, a charge can be prepared having the requisite silica content.

The charge can be introduced into the reducing furnace in a cold state but it is more advantageous to preheat it. The preheating, which may be carried up to the reducing temperature and even higher, has the effect of correspondingly shortening the reducing operation. The reducing action of the carbon is thus accelerated with a result that the spongy iron is formed more rapidly. This measure does not lead to any appreciable cooling of the reducing furnace. The preheating has moreover the important advantage that it prevents the damage to the furnace lining which would be produced in the case of a non-preheated charge by means of the steam produced by the evaporation of the moisture content of the charge in the furnace.

The lime-stone required for the decomposition of the ferrous silicate slag is rapidly decomposed so that the calcium oxide reacts correspondingly rapidly with the not yet completely liquefied ferrous silicate to form calcium silicate whilst the ferrous oxide is reduced to iron.

The preheating can be so conducted as simultaneously to expel from the originating material harmful substances, such as for example, sulphur. The preheating can be carried out for example, in a rotary tube furnace arranged in front of the reducing furnace, said rotary tube furnace being heated by the effluent gases from the reducing furnace. Other substances such as zinc, tin, lead and other volatilizable metals can also be wholly or partially volatilized from the charge during the preheating. In such cases, the preheating is conducted as it were after the manner of the Waelz process as set forth in U. S. Patent No. 1,618,204. Roasting processes can also be employed for preheating in cases where spathic iron ore, roasted pyrites or other sulphuriferous material is used as the ferruginous orignating material for the process. It is however not absolutely necessary to expel the aforesaid constituents from the originating material by preheating. In fact, tin, lead, zinc, antimony, arsenic and similar volatilizable metals can be expelled from the charge to a very large extent by the reducing process proper. These metals can be recovered from the furnace waste gases in the form of their oxides. Even sulphur is partly expelled during the reduction.

The lime required for the decomposition of the ferrous silicate slag can, as is apparent from the foregoing description, be likewise added to the charge at the outset of the process. If the charge be introduced into the reducing furnace in a preheated state, the lime can be added before or after the preheating. It is however, also possible to introduce the lime separately into the reducing furnace at a suitable point.

When the reduction has proceeded to a sufficient extent, the silicate slag is tapped off from the furnace and the iron is subjected to the finishing process either in the furnace itself or in the second furnace, (rotary furnace, hearth furnace or electric furnace) into which the crude steel tapped off from the reducing furnace is introduced in a molten condition. The finishing process is carried out in known manner, for example by applying lime, calcined spathic iron ores, manganese ore and if required ferromanganese, to the molten iron. The slag produced during the finishing process can be added to a subsequent charge in order to utilize the iron, manganese and the like contents of the slag.

Finishing in a separate furnace is preferable when the reducing furnace is necessarily coupled owing to the nature of its charge, with another apparatus used for the pretreatment of the charge such as a Waelz furnace, Dwight-Lloyd apparatus or preheating furnace.

In order more clearly to understand the invention, reference is made to the accompanying drawings, which illustrate diagrammatically and by way of example, two different embodiments of apparatus suitable for carrying the same into practical effect and in which:—

Figure 1:
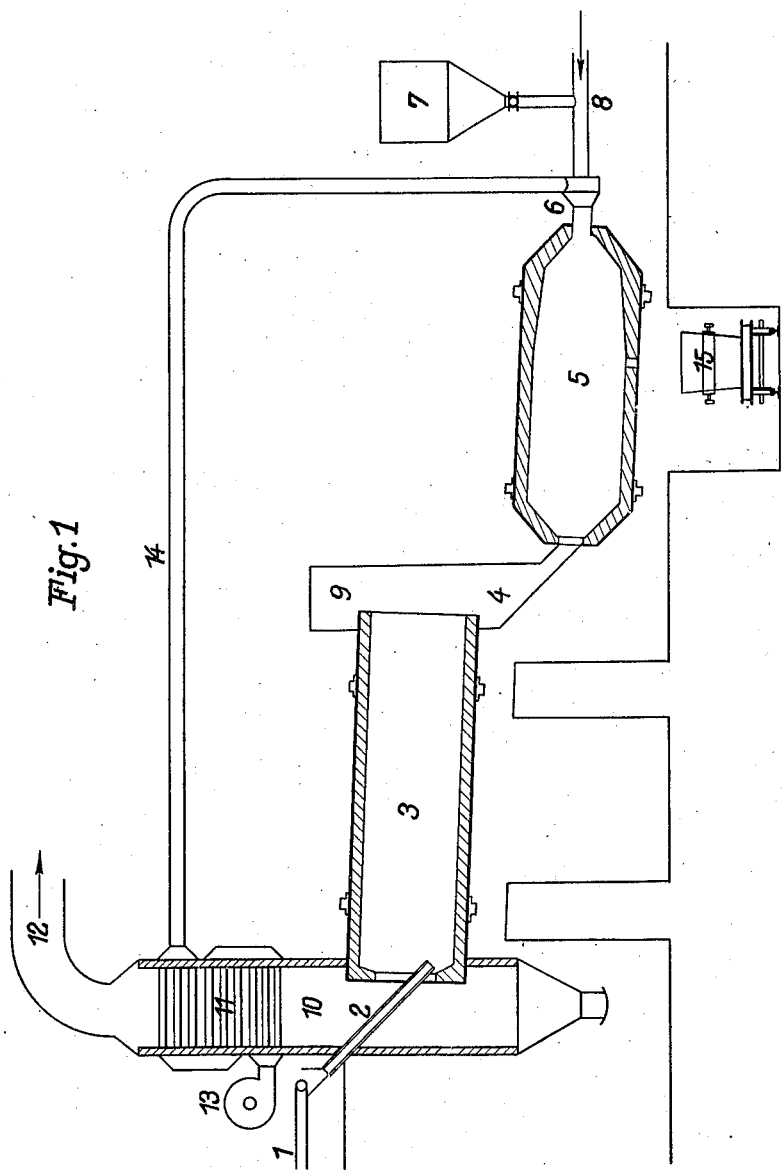
Fig. 1 is a longitudinal section through one embodiment.

In the embodiment shown in Fig. 1, the raw material, which may have been pretreated upon a band sintering apparatus for the purpose of roasting or agglomeration is, after having been mixed with about 20% of reducing carbon (in the form of for example coke slack) conveyed in the comminuted or uncomminuted state, by means of a conveyor band 1 and supply pipe 2 into a rotary tube furnace 3. The more volatile metals, such as zinc, lead and the like are removed from the originating material in this furnace by known processes, for example by the Waelz process. The material which has been freed as much as possible from the volatile metals, is transferred from the furnace 3 whilst avoiding heat losses as much as possible, through the chute 4 into the reducing furnace 5 which is heated by a coal dust burner 6. The carbon and other additions required for the reduction of iron can likewise be introduced through the chute 4, the reducing carbon and additions gaining access to this chute through laterally disposed storage bunkers. 7 is the storage bunker for the coal dust and 8 the supply pipe therefor. The effluent gases from the furnace 5 pass via the chute 4 and the connection 9 into the furnace 3 in which they yield up a portion of their heat to the fresh material undergoing treatment.

From the furnace 3 the waste gases pass into the flue 10 and from thence into the air preheater 11 from whence they flow through conduit 12 into a filtering device in which the metallic oxides are precipitated therefrom.

A fan 13 forces the combustion air through the heat exchanger 11 and pipe 14 into the coal dust burner 6 of the furnace 5.

A ladle 15 receives the contents of furnace 5 on the termination of the reduction process.

If ore containing no volatilizable metals has been worked up in a plant of the foregoing description, then the furnace 3 serves merely to preheat the material. Material which is free from or poor in sulphur can be supplied directly to furnace 3 by means of the conveyor 1 without any preliminary roasting. The furnace 3 may also be employed for roasting the originating material.

The plant may also be so arranged that the carbon required for the reduction in furnace 5 is already mixed with the material before it enters the furnace 3.

Figure 2:
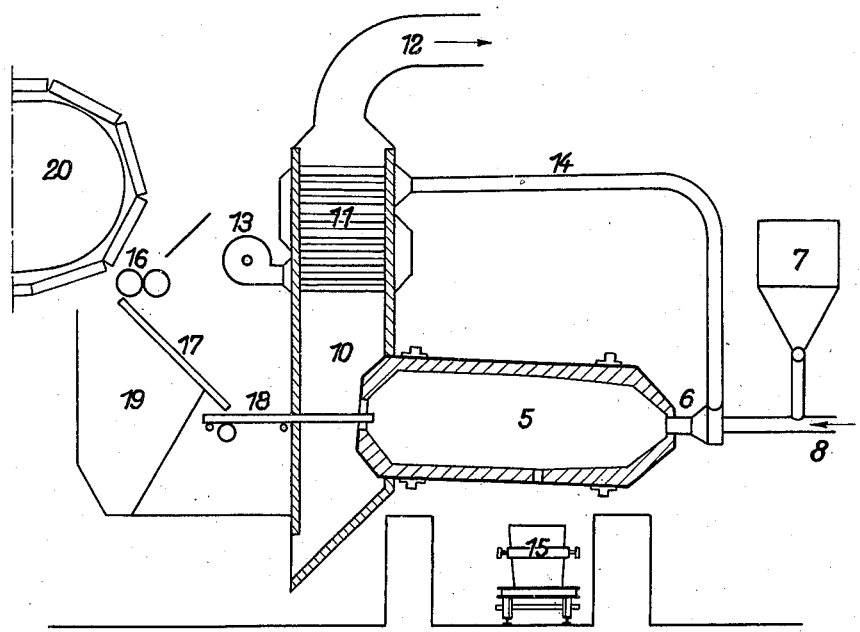
Fig. 2 is a corresponding section through a second embodiment.

In the embodiment illustrated in Fig. 2 the furnace 3 is omitted. The material under treatment first falls from a roasting or sintering apparatus 20 between crushing rolls 16, and after comminution it falls over a screening device 17, into the charging trough 18. The material falling through the screen 17 is collected in the bunker 19 and can serve as a covering for the grate of the sintering apparatus 20. The charging trough 18 conveys the ore into the reducing furnace 5, after the fuel such as coke and the additions, such as lime and silica, which are required according to the invention for the reduction of iron, have been mixed with the material on the trough.

The heater for the furnace 5 and the air preheaters 13, 11 and 14 can be constructed in the same manner as in the embodiment illustrated in Fig. 1.

If they contain metal or have to be freed from dust the waste gases from the furnace 5 are caused to pass through the flue 10 and pipe 12 into a filtering plant. If the gases do not contain any profitably recoverable constituents they can be passed direct to the stack. When the reduction is completed the contents of the furnace 5 can be tapped off into the ladle 15 as already described, this operation obviously being carried out in such a manner that either first the slag and then the steel are received separately in separate ladles 15 or vice versa. The furnace 5 can be rotated by means of any suitable known apparatus.

*Example*

The process of the present invention may be carried out, in the hereinbefore described apparatus illustrated in the accompanying drawings, in the following manner:

Roasted pyrites having the following approximate composition:—

| | Per cent |
|---|---|
| Fe | 42.1 |
| Zn | 8.0 |
| S | 3.4 |
| $SiO_2$ | 10.9 |
| Moisture | 15.0 | is dead roasted upon a Dwight-Lloyd sintering apparatus with the addition of about 6% of coke slack. The resulting agglomerate then has approximately the following composition:—

| | Per cent |
|---|---|
| Fe | 48.0 |
| Zn | 8.6 |
| S | 0.1 |
| $SiO_2$ | 12.5 |

The agglomerate is freed from zinc in a rotary drum furnace by the known Waelz process, either in the condition in which it was discharged from the sintering device or after being first comminuted, whilst about 20% of coke slack is added thereto. If the material contains in addition other volatile metals, these latter may obviously simultaneously be removed together with the zinc, the volatile metallic oxides being recovered from the waste gases of the Waelz furnace in a filtering device (electrical precipitator, a bag filter or the like). After being subjected to this treatment the material has approximately the following composition:—

| | Per cent |
|---|---|
| Fe | 54.2 |
| Zn | 1.5 |
| S | 0.08 |
| $SiO_2$ | 15.0 |

The material is then fed continuously or in batches into the iron reducing furnace which is preferably heated by a coal dust burner at the end opposite the charging end. About 30% of coke slack and 5% of limestone are added to the charge and the charge gradually acquires a continually increasing temperature in the furnace. Ferrous oxide slag and spongy iron are formed. Ferrous oxide is gradually liberated from the ferrous oxide slag due to the action of the lime, and this oxide is likewise reduced to the metallic condition whilst the already reduced iron gradually absorbs carbon and melts. Owing to the rotary movement of the furnace, the molten iron separates out from the slag which latter remains in a pasty to viscous condition during the greater part of the reduction period. When the material is added to the furnace in batches, the silicate slag is fused after about two hours have elapsed and is substantially free from iron; it is then tapped off in a molten condition. For the after-treatment of the molten steel, some lime, about 5% of calcined spathic iron ores and about 0.6 ferromanganese are then added and, after a short refining treatment, the molten steel may be tapped off from the furnace. It has approximately the following composition:—

| | |
|---|---|
| Fe | 98.0–98.5% |
| C | 0.8–1.2% |
| P | 0.02% |
| Si | traces |
| Zn | ----- |
| Cu | 0.08% |
| As | 0.01% |
| S | 0.03–0.04% |
| Mn | 0.13% |

The yield of molten steel amounts to about 92% of the iron content of the ore and the melting point of the steel is in the neighbourhood of 1400° to 1450°. The furnace temperature rises to between 1600° to 1700° C. The tapped off molten silicate slag contains about 5% of iron, 40% of silica and 15 to 20% of lime and can be cast into paving stones in known manner.

The hereindescribed process may also be carried out by charging the zinciferous agglomerate directly into the iron reducing furnace. The zinc and any other volatile metal contained in the material are then volatilized whilst the iron is being reduced. The iron reducing furnace can also be fired with gas or oil instead of with coal dust. Moreover, lean coal, lignite, wood charcoal and similar fuels may be employed as reducing agents instead of coke slack.

Other known roasting or preheating furnaces may be employed in place of the rotary drum 3. Moreover other sintering apparatus, such as sintering pans may be employed instead of a band sintering apparatus for the roasting or agglomeration of the material. In many cases the preparatory treatment of the material can be dispensed with the material then being charged direct into the iron reducing furnace.

We claim:—

1. The process of producing molten iron or steel by direct reduction which comprises introducing into a rotary tube-furnace a charge containing oxidic iron compounds, a solid carbonaceous combustible and silica; subjecting said charge to direct heat to raise the charge to a reducing temperature to effect conversion of said oxidic iron compounds to solid metallic iron and ferrous silicate slag; decomposing said ferrous silicate slag by means of lime at further increased temperatures; reducing to metallic iron ferrous oxide displaced in the slag by said lime; converting the reduced solid iron to the molten state; and withdrawing from the furnace the iron and the slag in a molten condition.

2. The process of producing molten iron or steel by direct reduction which comprises introducing into a horizontal rotary tube-furnace a charge containing oxidic iron compounds, a solid carbonaceous combustible and silica, heating said charge by direct heat to a reducing temperature of approximately 900° C. to effect conversion of said oxidic iron compounds to solid metallic iron and ferrous silicate slag, decomposing said ferrous silicate slag by means of lime at gradually increasing temperatures; reducing to metallic iron ferrous oxide displaced in the slag by said lime; converting the reduced solid iron to the molten state; and withdrawing from the furnace said iron and the slag in a molten condition.

3. The process of producing molten iron or steel by direct reduction which comprises preheating at least part of a charge containing oxidic iron compounds, a solid carbonaceous combustible and silica; introducing said charge into a horizontal rotary tube-furnace; subjecting said charge to direct heat to raise the charge to a reducing temperature to effect converson of said oxidic iron compounds to solid metallic iron and ferrous silicate slag; decomposing said ferrous silicate slag by means of lime at further increased temperatures; reducing to metallic iron ferrous oxide displaced in the slag by said lime; converting the reduced solid iron to the molten state; and withdrawing from the furnace said iron and the slag in a molten condition.

4. The process of producing molten iron or steel by direct reduction which comprises preheating at least part of a charge containing oxidic iron compounds, a solid carbonaceous combustible and silica by means of waste gases of combustion of a horizontal rotary tube-furnace; introducing said charge into said rotary tube-furnace; subjecting said charge to direct heat to raise the charge to a reducing temperature to effect conversion of said oxidic iron compounds to solid metallic iron and ferrous silicate slag; decomposing said ferrous silicate slag by means of lime at further increased temperatures; reducing to metallic iron ferrous oxide displaced in the slag by said lime; converting the reduced solid iron to the molten state; and withdrawing from the furnace said iron and the slag in a molten condition.

5. The process of producing molten iron or steel by direct reduction which comprises introducing into a rotary tube-furnace a preheated charge containing oxidic iron compounds, compounds of zinc, lead and other volatile metals, solid carbonaceous combustibles, and silica; subjecting said charge to direct heat to raise the charge to a reducing temperature to effect conversion of said oxidic iron compounds to solid metallic iron and ferrous silicate slag; decomposing said ferrous silicate slag by means of lime at further increased temperatures; reducing to metallic iron ferric oxide displaced in the slag by said lime; converting the reduced solid iron to the molten state; withdrawing from the furnace said iron and the slag in a molten condition; and recovering from the furnace gases volatilized zinc, lead and other volatile metals.

6. The process of producing molten iron or steel by direct reduction which comprises introducing into a rotary tube-furnace a preheated charge containing oxidic iron compounds, compounds of zinc, lead and other volatile metals, solid carbonaceous combustible, and silica; subjecting said charge to direct heat to raise the charge to a reducing temperature to effect conversion of said oxidic iron compounds to solid metallic iron and ferrous silicate slag; decomposing said ferrous silicate slag by means of lime at further increased temperatures; reducing to metallic iron ferric oxide displaced in the slag by said lime; converting the reduced solid iron to the molten state; withdrawing from the furnace said iron and the slag in a molten condition; withdrawing the furnace gases; utilizing said gases to preheat the following charge and the combustion air for the furnace; and finally recovering from said furnace gases volatilized zinc, lead and other volatile metals.

7. The process of producing molten iron or steel by direct reduction which comprises introducing into a rotary tube furnace a preheated charge containing oxidic iron compounds, compounds of zinc, lead and other volatile materials, solid carbonaceous combustibles and silica; subjecting said charge to direct heat to raise the charge to a reducing temperature to effect conversion of said oxidic iron compounds to solid metallic iron, and ferrous silicate slag; decomposing said ferrous silicate slag by means of lime at further increased temperatures; reducing to metallic iron ferric oxide displaced in the slag by said lime; converting the reduced solid iron to the molten state; withdrawing from the furnace said iron and the slag in a molten condition; withdrawing the furnace gases; cooling said gases and recovering therefrom volatilized zinc, lead and other volatile metals.

8. The process set forth in claim 1 in which the lime for decomposing the ferrous silicate slag is charged into the furnace with the oxidic iron compound, solid combustible and silica.

9. The process set forth in claim 1 in which the furnace gases are utilized for preheating the combustion air used for heating the furnace.

10. The process of producing molten iron or steel by direct reduction of substances containing oxidic iron compounds which comprises subjecting said substances in contact with a solid carbonaceous combustible and with slag-forming constituents to direct heat while agitating the same to convert said oxidic iron compounds into solid metallic iron and a slag containing ferrous oxide; reducing ferrous oxide contained in the slag and then melting the reduced solid iron, whereby the iron and the slag may be withdrawn from the furnace in the molten state.

11. The process set forth in claim 1 in which silica is introduced into the charge by using siliceous ores in sufficient quantity to permit formation of a ferrous silicate slag at the beginning of the reduction.

FRITZ EULENSTEIN.
ADOLF KRUS.